United States Patent Office 3,316,091
Patented Apr. 25, 1967

3,316,091
LIGHT SENSITIVE PHOTOGRAPHIC MATERIAL
Carlo Rossi and Helmut Boehl, Bottmingen, Switzerland, assignors to Ciba Limited, Basel, Switzerland, a Swiss company
No Drawing. Original application Jan. 14, 1960, Ser. No. 2,360. Divided and this application Sept. 16, 1963, Ser. No. 309,321
Claims priority, application Switzerland, Jan. 26, 1959, 68,743
3 Claims. (Cl. 96—84)

This is a division of application Serial No. 2,360, filed January 14, 1960, now abandoned.

This invention provides light-sensitive photographic materials containing a yellow dyestuff.

It is known to use for color photography photographic materials which contain a plurality of light-sensitive layers each of which is sensitized to a different region of the spectrum and, after being exposed and suitably treated, yields a component color picture. There are usually three such layers which are sensitive to the blue, green and red regions of the visible light spectrum and, after suitable treatment, yield a yellow, purple (magenta) and a blue-green (cyan) component picture. In order to produce in the several layers the necessary selective sensitivity for the various regions of the spectrum the green-sensitive and red-sensitive layers are optically sensitized, but the inherent blue sensitivity of these layers remains unaffected. In order to prevent these two layers from being influenced by blue light, an additional layer, generally a yellow filter layer, is provided.

The dyestuffs present in the yellow filter layer must possess a large number of diverse and in some cases opposing properties. They must first of all fulfill the necessary optical requirements, that is to say, they must cause as much absorption as possible in a sharply defined region of the spectrum and as little absorption as possible in the remainder of the spectrum. In view of the fact that the filter dyestuff is required merely during the exposure and is not required in the finished picture, the dyestuff must be capable of being completely and irreversibly bleached-out, preferably by the action of one of the processing baths. The conversion products formed by bleaching-out must either be easily water-soluble and removing by washing or, if they remain in the material, they must be colorless and cause no subsequent discoloration. Furthermore, they must not act upon other substances present in the photographic material, for example, the dyestuffs present in the colored layers. For instance, they must not reduce the fastness to light of the dyestuffs in the colored layers. They should also have no disadvantageous action on the photographic properties of the layers used, nor should they have any desensitizing action, cause fog formation, alter the gradation, reduce the keeping qualities of the material or the like. The filter dyestuff should also have a high resistance to diffusion. Accordingly, the requirements that the filter dyestuffs must fulfill are very diverse and often of an opposing character such, for example, as the requirements that the dyestuff shall be easily bleachable and possess a high resistance to diffusion.

The present invention provides photographic materials which have such a dyestuff incorporated therein.

The dyestuff corresponds to the formula

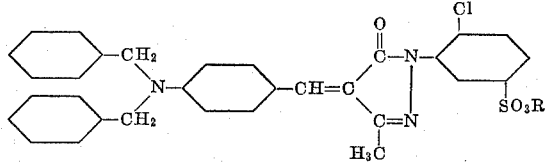

in which R represents a hydrogen atom or an alkali metal atom, e.g. lithium, sodium or potassium. The dyestuff can be manufactured by condensing para-dibenzylaminobenzaldehyde with 1-(2'-chlorophenyl)-3-methyl-5-pyrazolone-5'-sulfonic acid.

The dyestuff of this invention is especially suitable for the production of filter layers, especially in a color photographic material as a yellow filter layer interposed between the blue-sensitive layer and the layers sensitized to other regions of the spectrum. It can also be used for producing anti-halation layers, and it may be used as damping dyestuff incorporated in silver halide emulsions or for coloring the dispersed of dispersing phase in composite emulsions. In all these cases the dyestuff may be used alone or together with other suitable dyestuffs. In utilizing the dyestuff as a filter or anti-halation layer, any conventional method for casting the layer may be employed. E.g. the layer may be roller-coated on the substrate or may be applied by dipping and air-drying.

The dyestuff used in the invention is fast to diffusion, but is also capable of being easily and irreversibly bleached by the usual treatment baths, especially alkaline baths containing sulfite. These properties are not impaired by substances present in neighboring layers or by the processes used for making them. Thus, it is especially suitable, for example, for incorporation in filter layers or anti-halation layers in multi-color photographic materials suitable for the silver-dye bleaching process, especially when the image-forming dyestuffs in the neighboring layers are fast to diffusion or have been rendered fast to diffusion by precipitation with biguanides. The good capacity of the dyestuff for being bleached completely and the fact that its optical absorption is confined to a closely limited region of the spectrum are important advantages, especially in the case of pictures that are to be viewed by reflected light for which purpose it is known that the production of pure whites is a difficult problem and filter dyestuffs fulfilling high demands with regard to their spectral qualities are desired.

None of these properties could have been foreseen, as the dyestuffs of low molecular weight hitherto used for such purposes have been difficult or impossible to bleach out completely, when their fastness to diffusion has been enhanced, for example, by precipitation with basic precipitants.

The good fastness to diffusion coupled with the ease with which it can be bleached is a property not to be expected of the dyestuff used in the invention, as for example, similar dyestuffs which have been made by the condensation of para-diethylaminobenzaldehyde or para-dimethylaminobenzaldehyde with 1-(2'-chloro-5'-sulfo)-3-methyl-pyrazolone-(5), although they possess an excellent capacity for being bleached in the usual developers containing sulfite, possess so poor fastness to diffusion that their use in filter layers is practically ruled out.

The following example illustrates the invention:

*Example*

(a) *Manufacture of the dyestuff.*—9.7 grams of 1-(2'-chlorophenyl)-3-methyl-5-pyrazolone-5'-sulfonic acid are dissolved in 160 cc. of water, the pH-value of the solution is adjusted to 6.0 by the addition of aqueous sodium hydroxide solution, and the whole is then heated at 70° C. under reflux. There is then run into the solution, while stirring, a solution, heated to 70° C., of 10 grams of para-dibenzylaminobenzaldehyde in 200 ccm. of ethanol of 96% strength, which contains an addition of 0.2 cc. of piperidine, the addition of the latter solution being complete in 5 minutes. The whole is then heated at the boil for ¼ hour while stirring, and the reaction solution is cooled to room temperature and allowed to stand for 16 hours.

After removing the small amount of unreacted para-dibenzylaminobenzaldehyde, the solution is evaporated to dryness in vacuo at 50–80° C. There are obtained 84 grams of the orange colored crude dyestuff, which is then purified by recrystallization from ethanol.

(b) *Use of the dyestuff.*—2 grams of the yellow filter dyestuff obtained as described above are dissolved in 136 cc. of water. 12 grams of powdered gelatine are dissolved in 150 cc. of water, and the gelatine solution is mixed with the dyestuff solution at 35° C. After the addition of 18 cc. of a solution of 8% strength of saponin, the solution is cast by roller coating.

The yellow-orange colored layer so obtained is completely bleached in known metol-hydroquinone developing solutions in the course of ½ minute, and exhibits no discoloration after being stored for a long time.

What is claimed is:

1. Light sensitive photographic material which contains a layer selected from the group consisting of a filter layer and an anti-halation layer, the filter and anti-halation dyestuffs of which correspond to the formula

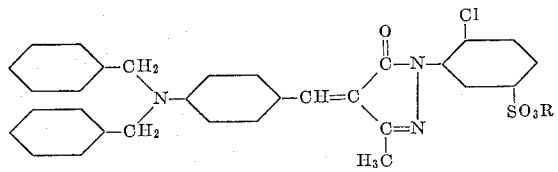

in which R stands for a member selected from the group consisting of a hydrogen atom and an alkali metal atom.

2. Light sensitive photographic material having a filter layer the filter dyestuff of which corresponds to the formula

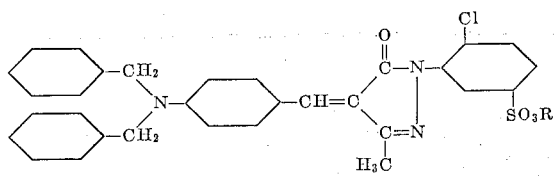

in which R stands for a member selected from the group consisting of a hydrogen atom and an alkali metal atom.

3. Light sensitive photographic material having an anti-halation layer, the anti-halation dyestuff of which corresponds to the formula

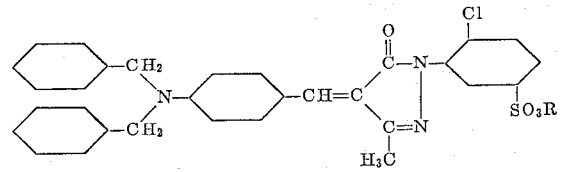

in which R stands for a member selected from the group consisting of a hydrogen atom and an alkali metal atom.

References Cited by the Examiner

UNITED STATES PATENTS 2,313,922   3/1943   Carroll et al. _____ 96—104

FOREIGN PATENTS 1,028,425   4/1958   Germany.

NORMAN G. TORCHIN, *Primary Examiner.*

R. H. SMITH, *Assistant Examiner.*